US010938878B2

United States Patent
Vyas et al.

(10) Patent No.: US 10,938,878 B2
(45) Date of Patent: Mar. 2, 2021

(54) SEPARATE CACHE SERVERS FOR STORING OBJECTS IN DIFFERENT DEDICATED SIZE RANGES

(71) Applicant: Red Hat, Inc., Raleigh, NC (US)

(72) Inventors: Jay Vyas, Concord, MA (US); Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 275 days.

(21) Appl. No.: 15/596,032

(22) Filed: May 16, 2017

(65) Prior Publication Data

US 2018/0337982 A1    Nov. 22, 2018

(51) Int. Cl.
*H04L 29/08*    (2006.01)

(52) U.S. Cl.
CPC ............ *H04L 67/02* (2013.01); *H04L 67/288* (2013.01); *H04L 67/2847* (2013.01); *H04L 67/2852* (2013.01); *H04L 67/2885* (2013.01); *H04L 67/1097* (2013.01)

(58) Field of Classification Search
CPC . H04L 67/1023; H04L 67/02; H04L 67/1097; H04L 67/2842; H04L 67/2847; H04L 67/2852; H04L 67/288; H04L 67/2885
See application file for complete search history.

(56) References Cited

U.S. PATENT DOCUMENTS

| | | | |
|---|---|---|---|
| 9,135,269 B2 | 9/2015 | Shetty et al. | |
| 9,164,702 B1 | 10/2015 | Nesbit et al. | |
| 9,325,997 B2 * | 4/2016 | Deshpande | ............ H04N 19/30 |
| 9,495,296 B2 | 11/2016 | Subramanyam et al. | |
| 10,133,673 B2 * | 11/2018 | Bedi | .................... G06F 16/9574 |
| 2012/0297010 A1 * | 11/2012 | Zhang | ................. H04L 67/2842 709/213 |
| 2013/0034170 A1 * | 2/2013 | Chen | ...................... H04N 13/00 375/240.25 |
| 2015/0237157 A1 | 2/2015 | Wang | |
| 2015/0100574 A1 | 4/2015 | Presta et al. | |
| 2016/0306832 A1 | 4/2016 | Hegde et al. | |
| 2017/0208148 A1 * | 7/2017 | Bran | ................... H04L 67/2842 |
| 2017/0297010 A1 * | 10/2017 | Richard | ............... C07C 213/04 |

(Continued)

FOREIGN PATENT DOCUMENTS

EP    2420042 B1 *    9/2012    ....... H04L 29/08729

OTHER PUBLICATIONS

Garrett, O., "Shared Caches with NGINX Plus Cache Clusters, Part 1," Jan. 24, 2017, https://www.nginx.com/blog/shared-caches-nginx-plus-cache-clusters-part-1/.

(Continued)

*Primary Examiner* — Patrice L Winder
*Assistant Examiner* — Aye M Aung
(74) *Attorney, Agent, or Firm* — Kilpatrick Townsend & Stockton LLP

(57) ABSTRACT

Cache servers can be dedicated to storing objects within certain size ranges such that each cache server is designated to store objects having a size within a particular size range that is different than the size range of objects to which at least one other cache server is designated to store. A memory device includes mappings between identifiers for objects and sizes of the objects. The mappings can be used to select a cache server from which to fetch a particular object to respond to a request for the particular object.

19 Claims, 5 Drawing Sheets

(56) References Cited

U.S. PATENT DOCUMENTS

| | | | | |
|---|---|---|---|---|
| 2017/0344470 | A1* | 11/2017 | Yang | G06F 3/0679 |
| 2017/0344491 | A1* | 11/2017 | Pandurangan | G06F 3/0643 |
| 2018/0004667 | A1* | 1/2018 | Xiang | G06F 3/0643 |
| 2018/0060359 | A1* | 3/2018 | Li | G06F 16/24578 |
| 2018/0124454 | A1* | 5/2018 | Kitahara | G06F 12/0813 |

OTHER PUBLICATIONS

Robinson, I., "Moving Graphs to Production at Scale," Dec. 17, 2015, https://neo4l.com/blog/graphs-to-production-at-scale/.

Xu, Z. et al., "An Efficient and Robust Web Caching System," Apr. 26-30, 2004, http://ieeexplore.ieee.org/document/1303315/.

Chen, G. et al., "A Scalable Cluster-based Web Server with Cooperative Caching Support," https://www.google.co.in/url?sa=t&rct=1&g=&esrc=s&source=web&cd=2&cad=ria&uact=B8veg=0ahUKEwiPgvvHm_nSAhVKu48KHel1DelOFookMAE&url=http%3A%2F%2Fi.cs.hku_h%2F-clwang%2Fpapers%2Fwebserver-p-jigsaw-Journal.doc&USG=AFQiCNEuGSEd2AMh_aEJkA-6agQwAb1scQ&bcm=bv_150729734,d.c2.

\* cited by examiner

SEPARATE CACHE SERVERS FOR STORING OBJECTS IN DIFFERENT DEDICATED SIZE RANGES

TECHNICAL FIELD

The present disclosure relates generally to network server support architecture. More specifically, but not by way of limitation, this disclosure relates to separate cache servers that store objects in different dedicated size ranges.

BACKGROUND

A network can include client devices in communication with servers. A client device can be a computing device that accesses information or a service made available by a server. One example of a client device can include a laptop computer or desktop computer used to access webpage content over the Internet. A server can be a computing device that provides the information or service to a client device. One example of a server can include a web server that provides webpage content to client devices.

Web servers fetch content such as objects from a fast-tier cache server or slow-tier persistent storage. Caching tiers can cache objects of any size in a slab of memory that has a fixed size. For example, memory of a cache server can be divided into slabs and each slab can have a fixed memory size. The fetched objects can be returned to client devices in response to requests for the objects.

DETAILED DESCRIPTION

There can be disadvantages to caching objects in slabs of fixed memory size. Memory fragmentation efficiency can suffer and defragmentation overhead can be experienced. That is, if slabs are over-provisioned or misaligned to requested object sizes, memory resources can be wasted. As one illustrative example, a cache server may be partitioned into 1 kB slabs and 1 MB slabs. A web object repository can have objects A, B, C, where object A is 128 bytes, object B is 1 kB, and object C is 4 kB. Object A can be stored in a 1 kB slab, but doing so wastes 896 bytes of memory. Object C can be stored in a 1 MB slab, but doing so wastes 3020 kB of memory. Furthermore, when cache memory is full for small slabs, the slabs are defragmented to make room to cache bigger objects upon fetching, which can result in expensive cached object eviction and memory block merging overhead.

Some examples of the present disclosure may overcome one or more of the abovementioned issues by using separate cache servers that are each dedicated to caching objects having a size within a particular size range. Object requests can be routed to the proper cache server by determining the size of the object and identifying the cache server that stores objects sized within a size range in which the size falls. A table of mappings that may be stored in a web server or in another device can associate object identifiers and object sizes. The mappings can be used to determine from which cache sever to fetch a particular object. Instead of having multiple one-size-fits-all caching servers, each caching server can be dedicated to storing objects within a specific size range.

In one example, a system includes cache servers and a memory device. Each cache server is designated to store objects having a size within a particular size range that is different than the size range of objects to which at least one other cache server is designated to store. The memory device includes mappings between identifiers for objects and sizes of the objects. The mappings can be used to select a cache server from which to fetch a particular object to respond to a request for the particular object.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
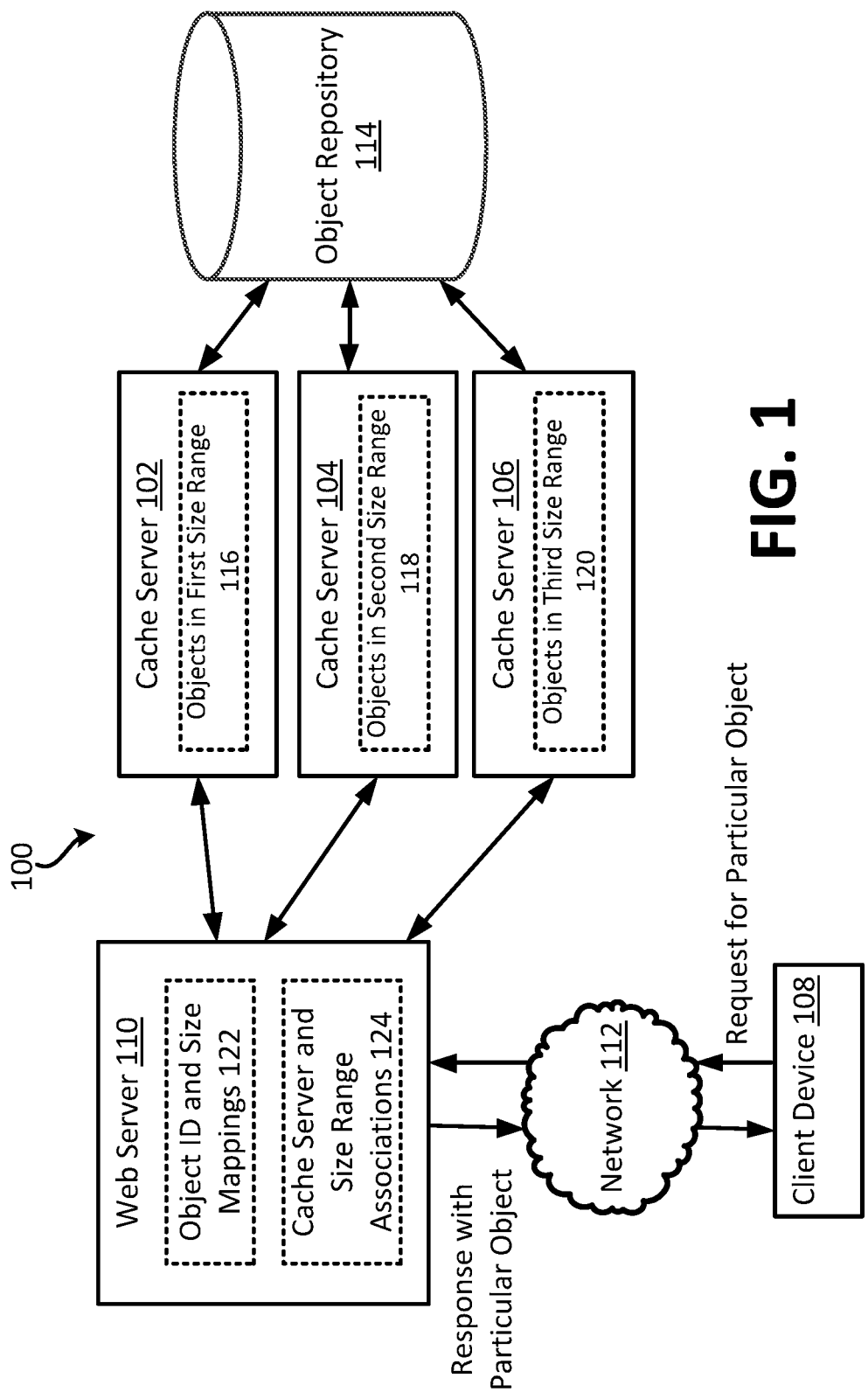
FIG. 1 is a block diagram of a system for storing objects in separate cache servers that are dedicated to storing objects in particular size ranges according to one example.

FIG. 1 is a block diagram of an example of a system 100 for storing objects in separate cache servers 102, 104, 106 that are dedicated to storing objects in particular size ranges according to some aspects. The system 100 includes a client device 108 and a web server 110 that can communicate with the client device 108 through a network 112. The network 112 can include the Internet, a local area network (LAN), a wide area network (WAN), a cellular network, or any combination of these. Examples of the client device 108 can include a laptop computer, a desktop computer, a cellular telephone, a tablet computer, an e-reader device, and, a network hardware device such as a router, a switch, or a hub. Although a web server 110 is shown by example for processing requests for web content and distributing information, the web server 110 may alternatively be a database server, a file server, or another type of server.

The cache servers 102, 104, 106 can be high-speed memory resources that are physically separate from each other and communicatively coupled to the web server 110 via direct or indirect communication links for exchanging requests and content. The cache servers 102, 104, 106 can also be communicatively coupled to an object repository 114 to fetch objects from the object repository 114 for storage in the cache servers 102, 104, 106. The object repository 114 can include one or more persistent memory data-storage devices for storing objects in larger, lower access-speed memory as compared to the cache servers 102, 104, 106. Although three cache servers 102, 104, 106 are shown in FIG. 1, any number of cache servers greater than one can be used.

Each of the cache servers 102, 104, 106 is designated to store objects having a size within a particular size range that is different than a size range for which the other cache servers are designated to store. For example, cache server 102 stores objects in a first size range 116. Cache server 104 stores objects in a second size range 118 that is different than the first size range. And cache server 106 stores objects in a third size range 120 that is different than the first size range and the second size range. Each of the cache servers 102, 104, 106 can fetch objects within the respective size ranges from the object repository 114 and store the objects in memory in the cache server.

The web server 110 can include mappings 122 between object identifiers and sizes of the objects. The web server 110 can also include associations 124 between cache servers and size ranges of objects. The web server 110 can use the mappings 122 and the associations 124 to determine the cache server from which to fetch a particular object. For example, the web server 110 can receive a request for a particular object from the client device 108 through the network 112. The request can identify the object requested and the web server 110 can use the object identifier and determine from the mappings 122 the size of the object. The web server 110 can use the size of the object to determine from the associations 124 which cache server among the available cache servers 102, 104, 106 is designated to store objects in a size range covering the size of the object. The web server 110 can fetch the particular object from the cache server determined to store objects of a size range in which the size of the particular object falls.

If the cache server that stores objects in a size range in which the size of the particular object falls has the particular object stored in cache memory, the cache server can return the object to the web server 110. If the particular object is not already stored in cache memory, the cache server can fetch the particular object from the object repository 114 and return the particular object to the web server 110, and store the particular object in cache memory. The web server 110 can transmit a response with the particular object to the client device 108 through the network 112.

Although the mappings 122 and the associations 124 are shown in FIG. 1 as being stored in the web server 110, in other examples, the mappings 122, the associations 124, or both can be stored in other devices in the system 100. For example, a separate device may be included in the system 100 for storing the mappings 122, the associations 124, or both. The separate device can be accessible to the web server 110 and may return information representing the size of the object requested or an identification of the cache server designated to store objects in a size range in which the size of the object requested falls.

By using a mapping between an object identifier and a size of the object, and an association between a cache server and the size range of objects that the cache server is designated to store, cache memory can be used to quickly fetch a particular object without slabs in cache servers being over-provisioned or misaligned to requested object sizes, and minimize inefficiencies due to defragmentation. Each cache server can have memory slabs that reduce waste due to objects of relatively small size being stored in slabs that can store larger objects because the cache server can be designated to store objects within a manageable size range. And defragmentation to store larger objects in multiple slabs can be minimized or eliminated. The mappings and associations can be used to quickly identify the appropriate cache server from which to fetch a particular object.

In other examples, the associations 124 are not used. Instead, the web server 110 can send a request that includes the size of the particular object determined from the mappings 122, and a cache server manager or one of the cache servers 102, 104, 106 can route the request to the appropriate cache server based on the size of the particular object. In other examples, the cache servers 102, 104, 106 can periodically broadcast to the web server 110 the size range designated for each of the cache servers 102, 104, 106.

Figure 2:
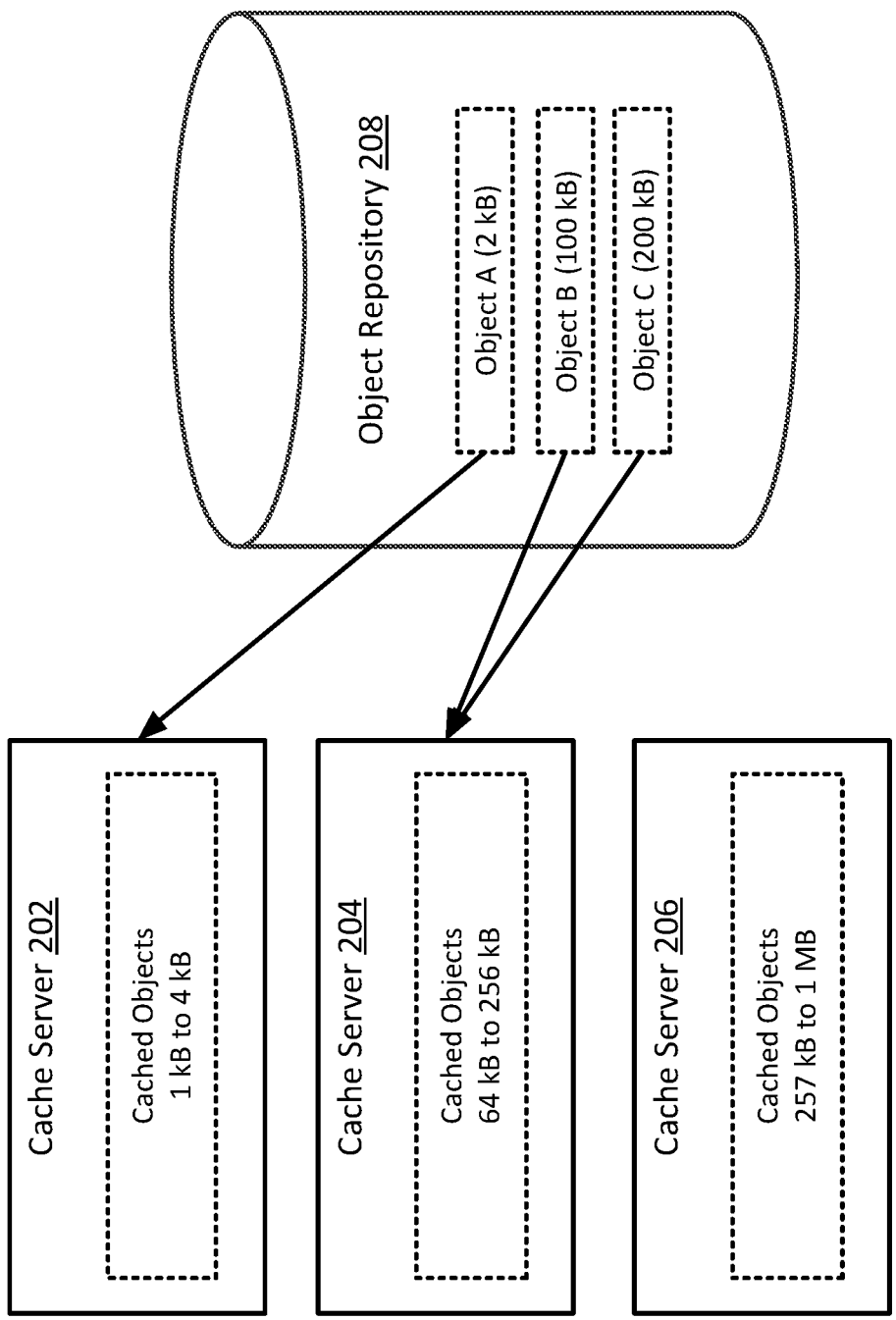
FIG. 2 is a block diagram of a group of cache servers and an object repository from which to obtain objects to store in the cache servers according to one example.

FIG. 2 is a block diagram of a group of cache servers 202, 204, 206 and an object repository 208 from which to obtain objects to store in the cache servers 202, 204, 206 according to one example. An example of the object repository 208 is a web-object repository. In the object repository 208, there are three objects shown as being stored, by example. Object A has a size of 2 kB, Object B has a size of 100 kB, and Object C has a size of 200 kB. Cache server 202 is designated as storing objects having a size in a range of 1 kB to 4 kB. Cache server 204 is designated as storing objects having a size in a range of 64 kB to 256 kB. Cache server 206 is designated as storing objects having a size in a range of 257 kB to 1 MB. The ranges are only examples. The cache servers 202, 204, 206 can be designated to store objects in respective size ranges by being configured to do so by a system administrator or a web server can automatically configure each cache server to store objects in a certain size range. In response to a cache server being designated to store objects in a certain size range, the memory in the cache server can be partitioned into shards and each shard can have a size corresponding to the maximum size of the size range.

Object A has a size within the range of cache server 202 such that object A is stored in cache server 202 when object A is caused to be stored in cache memory. Objects B and C each have a size with the range of cache server 204 such that objects B and C are stored in cache server 204 when each of objects B and C is caused to be stored in cache memory. In the example shown in FIG. 2, no object is depicted having a size within the range designated for cache server 206 such that none of the objects shown in FIG. 2 are stored in cache server 206.

Figure 3:
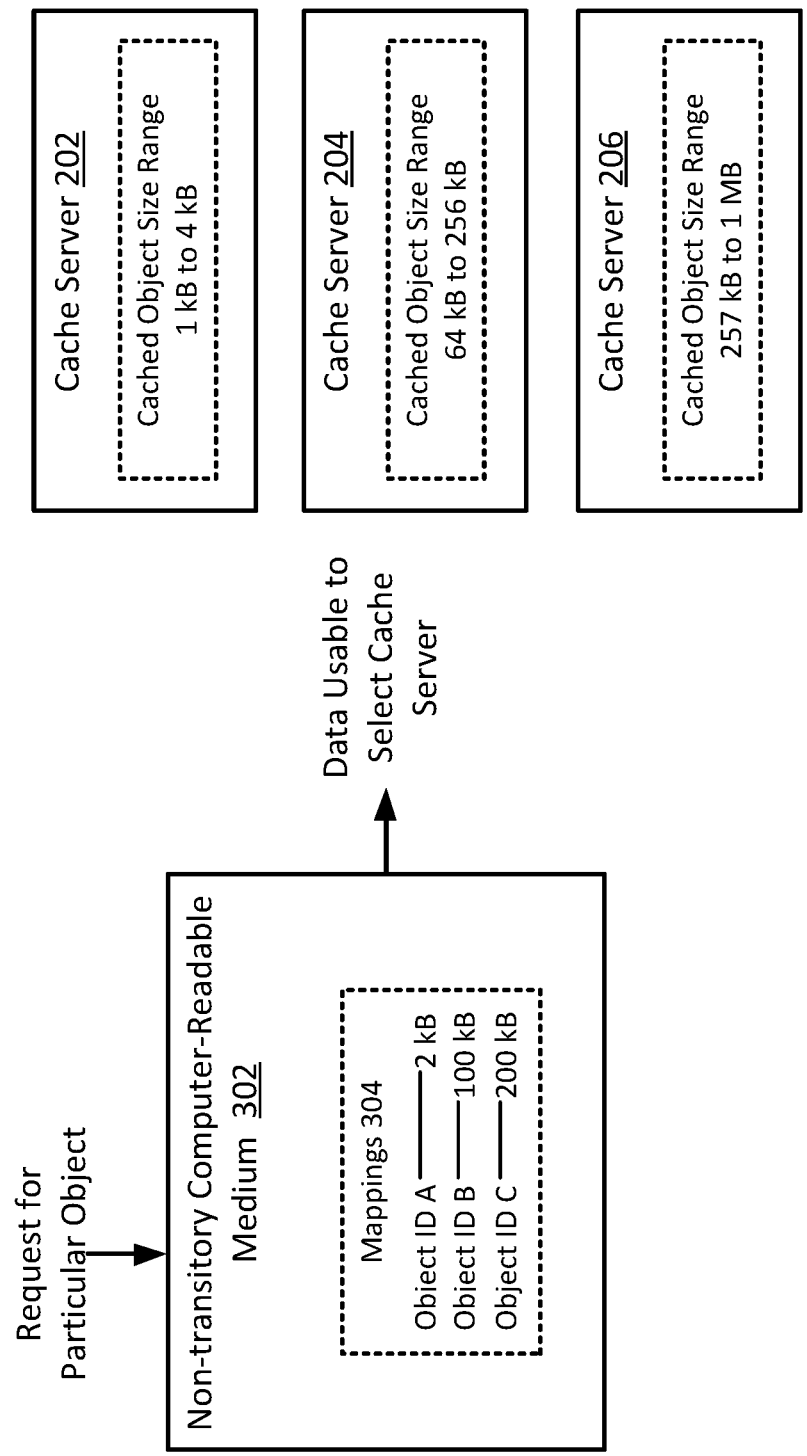
FIG. 3 is a block diagram of a non-transitory computer readable medium that includes mappings usable to select a cache server from which to fetch a particular object according to one example.

FIG. 3 is a block diagram of an example of a non-transitory computer readable medium 302 that includes mappings 304 usable to select a cache server from which to fetch a particular object according to one aspect. A computer-readable medium can include electronic, optical, magnetic, or other storage devices capable of providing a processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The cache servers 202, 204, 206 from FIG. 2 are shown, and each cache server may store certain objects having sizes that fall within the size range designated for that cache server. The size ranges shown in FIG. 3 are examples only and illustrate that the size range for cache server 202 is different than the size range for cache server 204 and the size range for cache server 206. Depending on need, more than one cache server may be designated to store objects within the same size range, but such a system also includes at least one other cache server that is designated to store objects within a different size range.

The non-transitory computer readable medium 302 may be included in a web server or in a separate device communicatively coupled to the web server. The mappings 304 in the non-transitory computer readable medium 302 are between object identifiers (IDs) and sizes of the objects. As an example, FIG. 3 shows mappings between object ID A and a size of 2 kB, between object ID B and a size of 100 kB, and between object ID C and a size of 200 kB. An object ID of a requested object can be used to determine from the mappings 304 a size of the object, which can be used to select the cache server from which to fetch the requested object.

Figure 4:
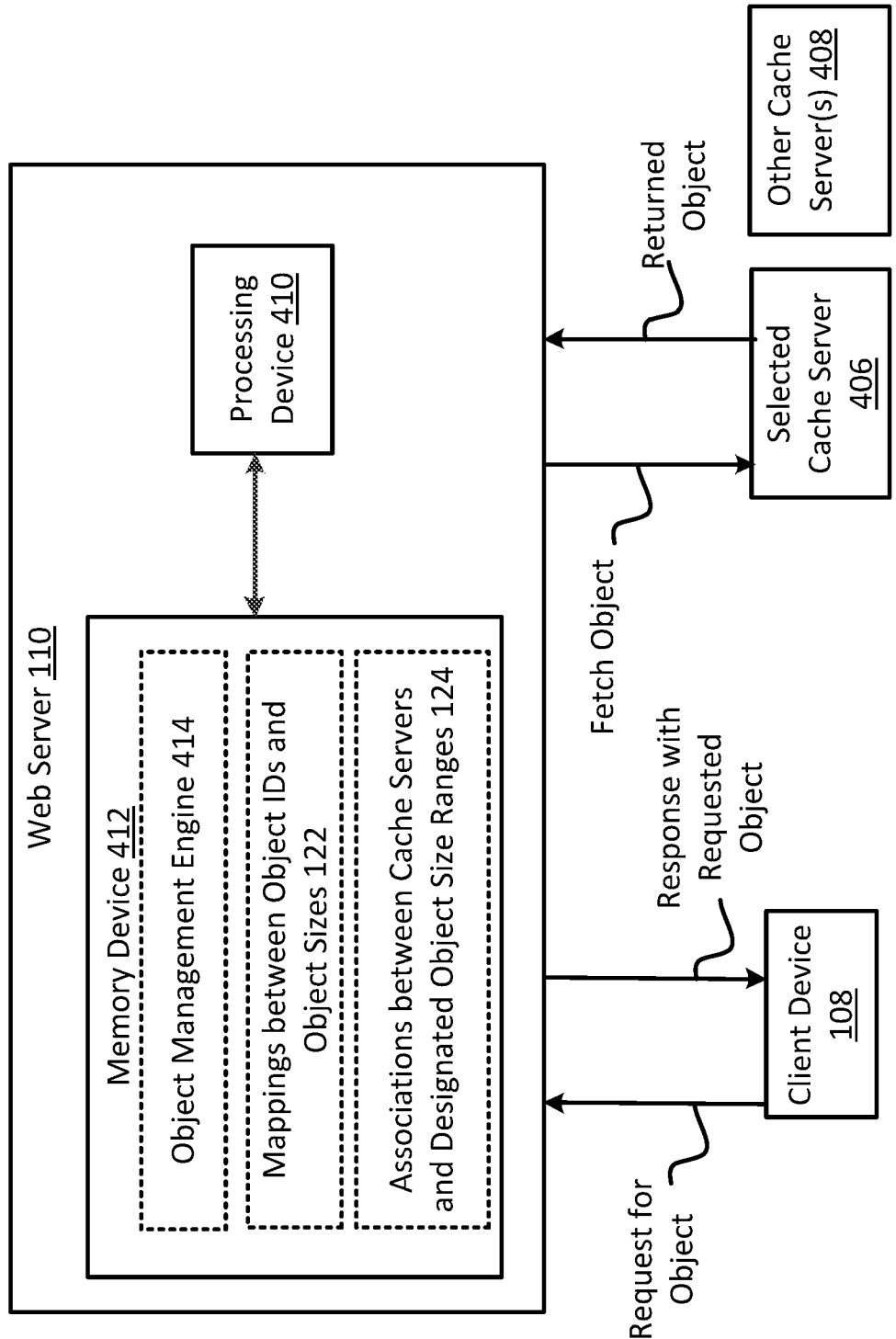
FIG. 4 is a block diagram of a web server in communication with the client device and cache servers according to one aspect.

FIG. 4 is a block diagram of an example of a web server 110 in communication with the client device 108 and cache servers 406, 408 according to some aspects. The cache servers 406, 408 may correspond to cache servers 102, 104, 106 in FIG. 1 or the cache servers 406, 408 may be different. The web server 110 has a processing device 410 communicatively coupled to a memory device 412. The processing device 410 can include one processing device or multiple processing devices. Non-limiting examples of the processing device 410 include a Field-Programmable Gate Array (FPGA), an application-specific integrated circuit (ASIC), a microprocessor, etc.

The processing device 410 can execute one or more operations for processing requests for objects from the client device 108 and selecting a cache server from which to fetch a particular object. The processing device 410 can execute instructions stored in the memory device 412 to perform the operations. In some examples, the instructions can include processor-specific instructions generated by a compiler or an interpreter from code written in any suitable computer-programming language, such as C, C++, C#, etc.

Memory device 412 can include one memory device or multiple memory devices. The memory device 412 can be non-volatile and may include any type of memory device that retains stored information when powered off. Non-limiting examples of the memory device 412 include electrically erasable and programmable read-only memory (EEPROM), flash memory, or any other type of non-volatile memory. In some examples, at least part of the memory device can include a medium from which the processing device 410 can read instructions. The memory device 412 can be a non-transitory computer readable medium.

The memory device 412 can include an object management engine 414, mappings between object IDs and object sizes 122, and associations between cache servers and designated object size ranges 124. In other examples, the mappings 122, the associations 124, or both can be stored external to the web server 110. The object management engine 414 can be executed by the processing device 410 to receive a request for an object from the client device 108, determine a size of the object to respond to the request using an object ID in the request and the mappings 122, and determine a cache sever from which to fetch the object using the size of the object and the associations 124. The object management engine 414 can also be executed to fetch the object from the selected cache server 406 and transmit a response to the client device 108 with the requested object returned from the selected cache server 406.

Figure 5:
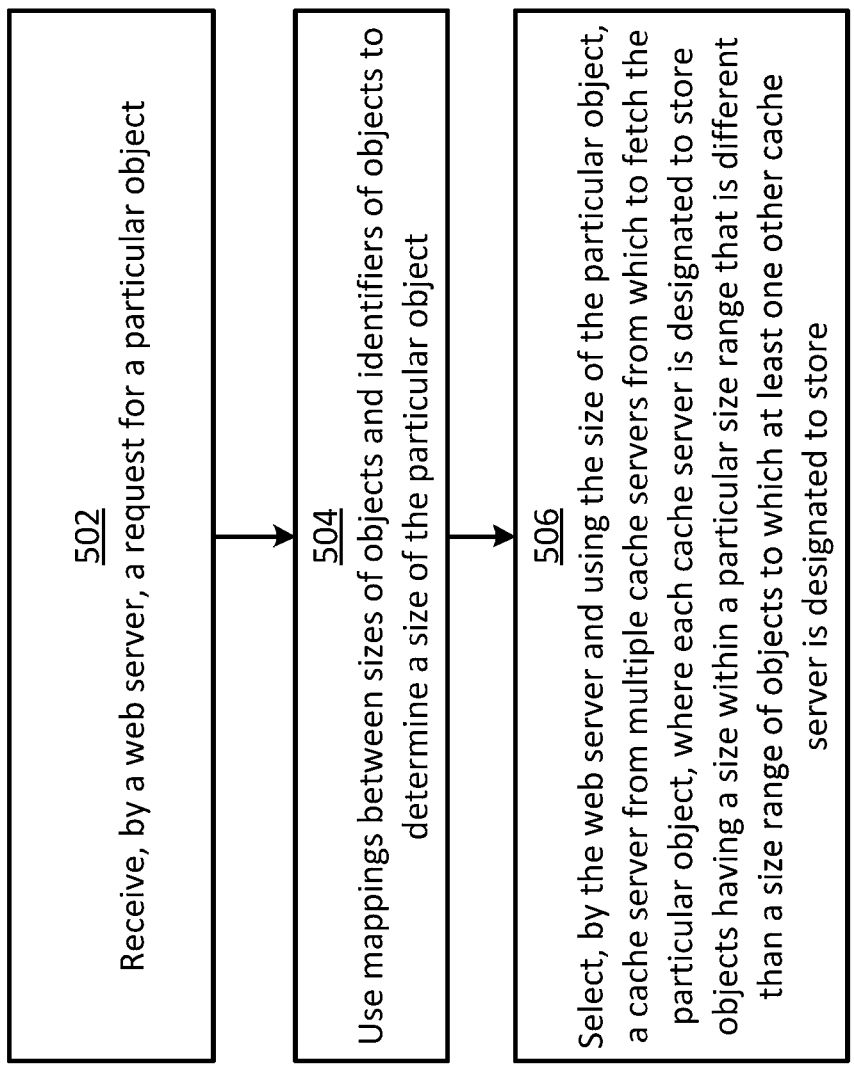
FIG. 5 is a flow chart of a process for selecting a cache server from which to fetch an object according to one example.

FIG. 5 is a flow chart of a process for selecting a cache server from which to fetch an object according to one example. The process of FIG. 5 can be performed by the components of FIG. 4, but other implementations are also possible.

In block 502, a web server receives a request for a particular object. The request can include an ID for the object and can be received from a client device over a network. The request may be received as an HTTP request and may be a request for one object or included in a request for multiple different objects.

In block 504, mappings between sizes of objects and identifiers of objects are used to determine a size of the particular object. In some examples, the web server accesses the mappings using the object ID in the request to determine a size of the object to respond to the request. In other examples, the web server receives the size of the object to respond to the request from a separate device that includes the mappings.

In block 506, the web server selects, using the size of the particular object, a cache server from multiple cache servers from which to fetch the particular object. Each cache server is designated to store objects having a size within a particular size range that is different than a size range of objects to which at least one other cache server is designated to store. In some examples, the web server includes associations between cache servers and size ranges of objects stored by the cache servers and using the size of the object to identify the cache server that stores objects in a size range in which the size of the object falls. In other examples, the web server receives a periodic update from the cache servers on the size ranges of objects that the cache servers store and uses the latest update, along with the size of the object requested to select the cache server from which to fetch the object.

The foregoing description of certain examples, including illustrated examples, has been presented only for the purpose of illustration and description and is not intended to be exhaustive or to limit the disclosure to the precise forms disclosed. Numerous modifications, adaptations, and uses thereof are possible without departing from the scope of the disclosure.

What is claimed is:

1. A system comprising:
   a plurality of cache servers, each cache server being designated to store objects having a size within a particular size range that is different than a size range of objects to which at least one other cache server in the plurality of cache servers is designated to store;
   a processing device; and
   a non-transitory computer-readable medium comprising program code that is executable by the processing device for causing the processing device to:
   receive a request for a particular object;
   access predefined mappings that include correlations between numerical sizes of objects and unique identifiers of the objects;
   determine a particular size of the particular object by comparing a unique identifier for the particular object to the unique identifiers of the objects in the predefined mappings, the particular size being a numerical value;
   access predefined associations specifying correlations between (i) unique identifiers of the cache servers in the plurality of cache servers and (ii) size ranges of objects to be stored in the cache servers; and
   select a particular cache server from among the plurality of cache servers from which to fetch the particular object by comparing the particular size of the particular object to the size ranges of the objects in the predefined associations.

2. The system of claim 1, wherein the non-transitory computer-readable medium further comprises program code that is executable by the processing device for causing the processing device to:
   fetch the particular object from the particular cache server selected from the plurality of cache servers.

3. The system of claim 1, wherein the plurality of cache servers is communicatively coupled to one or more web-object repositories for receiving from the one or more web-object repositories objects to store in the plurality of cache servers.

4. The system of claim 1, wherein the plurality of cache servers comprises:

a first cache server configured to store objects having a size only in a first range of object sizes;

a second cache server configured to store objects having a size only in a second range of object sizes that are larger than the object sizes of the first range; and a third cache server configured to store objects having a size only in a third range of object sizes that are larger than the object sizes of the second range, wherein the first cache server is physically separate from the second cache server and the third cache server, the second cache server being physically separate from the third cache server.

5. The system of claim 4, wherein:

the first cache server is partitioned into first slabs, each first slab having a size corresponding to an upper end of the first range of object sizes;

the second cache server is partitioned into second slabs, each second slab having a size corresponding to an upper end of the second range of object sizes; and the third cache server is partitioned into third slabs, each third slab having a size corresponding to an upper end of the third range of object sizes.

6. The system of claim 1, wherein the predefined associations are configured such that each cache server of the plurality of cache servers is associated with a size range of objects that the cache server is dedicated for storing in cache memory.

7. The system of claim 1, wherein the non-transitory computer-readable medium is separate from a web server, the web server being configured for receiving the request for the particular object from a network and fetching the particular object from the particular cache server selected from the plurality of cache servers.

8. A method comprising:

receiving, by a processor, a request for a particular object;

accessing, by the processor, predefined mappings stored in a non-transitory computer-readable medium, the predefined mappings including correlations between numerical sizes of objects and unique identifiers of the objects;

determining, by the processor, a particular size of the particular object by comparing a unique identifier for the particular object to the unique identifiers of the objects in the predefined mappings, the particular size being a numerical value;

accessing, by the processor, predefined associations stored in the non-transitory computer-readable medium, the predefined associations specifying correlations between (i) unique identifiers of cache servers in a plurality of cache servers and (ii) size ranges of objects to be stored in the cache servers, wherein each cache server among the plurality of cache servers is designated to store objects having a size within a particular size range that is different than a size range of objects to which at least one other cache server in the plurality of cache servers is designated to store;

selecting, by the processor, a particular cache server from among the plurality of cache servers from which to fetch the particular object by comparing the particular size of the particular object to the size ranges of the objects in the predefined associations; and fetching, by the processor, the particular object from the particular cache server.

9. The method of claim 8, further comprising:

receiving, by at least one cache server of the plurality of cache servers, one or more objects from an object repository and storing the one or more objects in cache memory, the object repository having a lower-speed memory than the plurality of cache servers.

10. The method of claim 8, wherein the plurality of cache servers comprises:

a first cache server storing objects having sizes only in a first range of object sizes;

a second cache server storing objects having sizes only in a second range of object sizes that are larger than the object sizes of the first range; and a third cache server storing objects having sizes only in a third range of object sizes that are larger than the object sizes of the second range.

11. The method of claim 10, wherein the first cache server is physically separate from the second cache server and the third cache server, the second cache server being physically separate from the third cache server.

12. The method of claim 8, wherein each cache server of the plurality of cache servers is partitioned into slabs, each slab in a respective cache server having a size corresponding to an upper end of a size range of objects to which that cache server is dedicated to store.

13. The method of claim 8, wherein the predefined associations are stored on a web server, and wherein the predefined associations are configured such that each cache server of the plurality of cache servers is associated with a size range of objects that the cache server is dedicated for storing in cache memory.

14. A non-transitory computer-readable medium comprising instructions executable by a processing device for causing the processing device to:

receive one or more requests to fetch at least three objects from a plurality of cache servers, wherein each cache server among the plurality of cache servers is designated to store objects having a size within a particular size range that is different than a size range of objects to which at least one other cache server in the plurality of cache servers is designated to store;

determine actual numerical sizes of the at least three objects by accessing predefined mappings stored in one or more memory devices, the predefined mappings including correlations between (i) unique identifiers for objects and (ii) actual numerical size values of the objects, wherein the actual numerical size values include a first numerical value that is unique to a first object among the at least three objects, a second numerical value that is unique to a second object among the at least three objects, and a third numerical value that is unique to a third object among the at least three objects; and select one or more cache servers from among the plurality of cache servers from which to fetch the at least three objects based on predefined associations stored in the one or more memory devices, the predefined associations including correlations between (i) unique identifiers of the cache servers in the plurality of cache servers and (ii) size ranges of objects to be stored in the cache servers.

15. The non-transitory computer-readable medium of claim 14, further comprising program code that is executable by the processing device for causing the processing device to:

fetch the first object from a first cache server configured to store objects with sizes only in a first range of object sizes;

fetch the second object from a second cache server configured to store objects with sizes only in a second range of object sizes that are larger than the object sizes of the first range; and fetch the third object from a third cache server configured to store objects with sizes only in a third range of object sizes that are larger than the object sizes of the second range.

16. The non-transitory computer-readable medium of claim 15, wherein the first cache server is physically separate from the second cache server and the third cache server, the second cache server being physically separate from the third cache server.

17. The non-transitory computer-readable medium of claim 14, wherein each cache server of the plurality of cache servers is partitioned into slabs, each slab in a respective cache server having a size corresponding to an upper end of a size range of objects to which that cache server is dedicated to store.

18. The non-transitory computer-readable medium of claim 14, further comprising instructions executable by the processing device for causing the processing device to:

fetch the at least three objects from the one or more cache servers selected from the plurality of cache servers; and respond to the one or more requests for the at least three objects by transmitting the at least three objects to one or more client devices over a network.

19. The non-transitory computer-readable medium of claim 14, wherein the non-transitory computer-readable medium is disposed in a web server configured to process HTTP requests and to be communicatively coupled to each cache server of the plurality of cache servers.

* * * * *